(12) United States Patent
Tsukamoto et al.

(10) Patent No.: US 10,119,594 B2
(45) Date of Patent: Nov. 6, 2018

(54) BALANCER DEVICE OF ENGINE AND MOTORCYCLE

(71) Applicant: SUZUKI MOTOR CORPORATION, Hamamatsu-shi, Shizuoka (JP)

(72) Inventors: Kohei Tsukamoto, Hamamatsu (JP); Shintaro Yagi, Hamamatsu (JP); Tomoyuki Oda, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/296,613

(22) Filed: Oct. 18, 2016

(65) Prior Publication Data

US 2017/0114859 A1 Apr. 27, 2017

(30) Foreign Application Priority Data

Oct. 27, 2015 (JP) ................................. 2015-210357
Oct. 27, 2015 (JP) ................................. 2015-210358

(51) Int. Cl.
*F16F 15/26* (2006.01)
*F02B 61/02* (2006.01)

(52) U.S. Cl.
CPC ............ *F16F 15/264* (2013.01); *F02B 61/02* (2013.01); *F16F 15/265* (2013.01); *F16F 2232/02* (2013.01)

(58) Field of Classification Search
CPC ...... F16F 15/264; F16F 15/265; F16F 15/267; F16F 15/268; F16F 15/26; F16F 15/20; F16F 15/22; F16F 2232/02
See application file for complete search history.

(56) References Cited

U.S. PATENT DOCUMENTS

| 5,884,599 | A | * | 3/1999 | Shiozaki | F02B 61/02 |
| | | | | | 123/192.2 |
| 6,263,853 | B1 | * | 7/2001 | Rau | F02F 7/0007 |
| | | | | | 123/192.2 |
| 2015/0083068 | A1 | * | 3/2015 | Sugiura | F16F 15/264 |
| | | | | | 123/192.2 |

FOREIGN PATENT DOCUMENTS

JP 9-329196 A 12/1997

* cited by examiner

*Primary Examiner* — Jacob Amick
(74) *Attorney, Agent, or Firm* — Stein IP, LLC (57) ABSTRACT

There is provided a balancer device of an engine. The balancer device is configured to reduce rotation vibrations of the engine. A crankshaft is disposed on a mating surface of a crank case divided into an upper case and a lower case. A balancer shaft is disposed below the crankshaft. A balancer housing accommodates therein the balancer shaft. The balancer shaft is disposed on a mating surface between the lower case and the balancer housing.

9 Claims, 10 Drawing Sheets

BALANCER DEVICE OF ENGINE AND MOTORCYCLE

CROSS-REFERENCE TO RELATED APPLICATIONS

The disclosure of Japanese Patent Application No. 2015-210357 filed on Oct. 27, 2015 and Japanese Patent Application No. 2015-210358 filed on Oct. 27, 2015, including specification, drawings and claims is incorporated herein by reference in its entirety.

TECHNICAL FIELD

The disclosure relates to a balancer device of an engine and a motorcycle.

BACKGROUND

An engine of a motorcycle has a balancer device so as to reduce vibrations generated in association with reciprocal movement of a piston and rotation of a crankshaft (for example, refer to Patent Document 1). In an engine disclosed in Patent Document 1, a balancer shaft having a weight is configured to rotate in conformity to rotation of a crankshaft, so that periodic rotation vibrations of the crankshaft are cancelled.

Patent Document 1: Japanese Patent Application Publication No. H09-329196A

In the engine of Patent Document 1, when attaching the balancer shaft to a crank case, the weight is disposed at a predetermined position in advance and the balancer shaft is inserted into a shaft hole of the crank case and a shaft hole of the weight from an outside of the crank case. Like this, according to Patent Document 1, the balancer shaft and the weight are separately attached to the crank case, so that a mounting operation is troublesome.

In addition, when attaching the balancer shaft to the crank case it is necessary to phase-adjust the balancer shaft with respect to the crankshaft. In Patent Document 1, the crank case is formed with an opening for phase adjustment. The phase adjustment is performed by inserting a finger from the opening and rotating the balancer shaft.

Accordingly, in Patent Document 1, a mounting ability such as insertion of the balancer shaft to the weight and phase adjustment of the balancer shaft is poor. Also, a man-hour of forming the opening for phase adjustment at the crank case is troublesome.

SUMMARY

It is therefore an object of the disclosure to provide a balancer device of an engine having a good mounting ability, and a motorcycle.

It is therefore another object of the disclosure to provide a balancer device of an engine capable of improving a mounting ability with a simple configuration, and a motorcycle.

According to an aspect of the embodiments of the present invention, there is provided a balancer device of an engine, configured to reduce rotation vibrations of the engine, the balancer device comprising: a crankshaft disposed on a mating surface of a crank case divided into an upper case and a lower case; a balancer shaft disposed below the crankshaft; and a balancer housing accommodating therein the balancer shaft, wherein the balancer shaft is disposed on a mating surface between the lower case and the balancer housing.

According to the above configuration, the crankshaft is disposed on the mating surface between the upper case and the lower case, so that it is possible to attach the crankshaft simply by interposing the same between the upper case and the lower case. Also, the balancer shaft is disposed on the mating surface between the lower case and the balancer housing, so that it is possible to attach the balancer shaft simply by interposing the same between the lower case and the balancer housing. Therefore, it is possible to attach the crankshaft and the balancer shaft with the peripheral components being assembled to the crankshaft or balancer shaft. As a result, a mounting ability of the engine is improved.

In the balancer device, the upper case, the lower case and the balancer housing may be fastened together by a fastening bolt. According to the above configuration, it is possible to reduce the number of the fastening bolts to be used, as compared to a configuration where the bolt fastening is performed for the crankshaft or the second balancer shaft. Thereby, it is possible to reduce the mounting man-hour and an operator's burden on the bolt fastening.

In the balancer device, the balancer housing may be formed to cover the balancer shaft. According to the above configuration, it is possible to support the balancer shaft simply by covering the balancer shaft with the balancer housing. Thereby, the mounting ability is improved.

In the balancer device, the balancer shaft may be disposed at one side of the engine in a right-left direction of the engine and an oil passage extending in a front-rear direction of the engine may be provided at the other side of the engine. According to the above configuration, since the balancer shaft is disposed at one side of the engine in the right-left direction of the engine and an empty space of the other side of the engine is provided with the oil passage, it is possible to efficiently utilize a space in the engine and to form an optimal oil passage. As a result, it is possible to make the engine compact.

In the balancer device, the balancer shaft may be disposed at an opposite side to a side stand configured to support a vehicle body with respect to the right-left direction. According to the above configuration, even when the side stand is used and the engine is thus inclined toward the side stand-side, the balancer shaft is located at a higher position than a liquid surface of the oil at the side stand-side. For this reason, it is possible to prevent the balancer shaft from being submerged in the oil, so that it is possible to reduce a mechanism loss upon start of the engine.

There may be a motorcycle comprising the above described balancer device.

According to another aspect of the embodiments of the present invention, there is provided a balancer device of an engine, configured to reduce rotation vibrations of the engine, the balancer device comprising: a crank case having an opening at a side thereof; a crankshaft disposed in the crank case; a balancer shaft disposed below the crankshaft; and a clutch cover attached to cover the opening of the crank case, wherein at least a part of the balancer shaft is positioned at an inner side of the opening of the crank case, as seen from a side of the engine.

According to the above configuration, it is possible to visibly recognize a part of the balancer shaft from the opening of the crank case. Therefore, it is possible to easily phase-adjust the balancer shaft from an outside of the crank case without providing a dedicated opening for phase adjustment. Also, the clutch cover is attached, so that the opening is blocked. Thereby, it is not necessary to provide a blind plug for blocking the opening. In this way, it is possible to improve the mounting ability with a simple configuration.

In the balancer device, a bearing configured to support the balancer shaft may be positioned at an inner side of the opening of the crank case, as seen from a side of the engine. According to the above configuration, the bearing of the balancer shaft is positioned at the inner side of the opening, so that it is possible to secure a space for processing the bearing. As a result, it is possible to improve the processing precision of the bearing.

The balancer device may further comprise a balancer housing accommodating therein the balancer shaft, and the bearing may be formed by the crank case and the balancer housing. According to the above configuration, since it is possible to mount the balancer shaft simply by interposing the same between the crank case and the balancer housing, the mounting ability is improved.

In the balancer device, the balancer shaft may be disposed at the same side as a clutch with respect to a right-left direction of the engine. According to the above configuration, since it is easy to visibly recognize the balancer shaft from the opening of the crank case, it is possible to easily perform the phase adjustment.

In the balancer device, an end portion of the crankshaft may be provided with a primary drive gear configured to drive the balancer shaft. According to the above configuration, since it is possible to rotate the balancer shaft by the conventional primary drive gear, it is not necessary to provide the crankshaft with a gear for driving the balancer shaft. Therefore, it is possible to simplify the configuration.

According to the disclosure, it is possible to improve the mounting ability of the engine by disposing the balancer shaft on the mating surface between the crank case and the balancer housing.

According to the disclosure, the balancer shaft is provided at the inner side of the opening of the crank case, so that it is possible to improve the mounting ability with the simple configuration.

DETAILED DESCRIPTION OF THE EMBODIMENTS

Hereinafter, an illustrative embodiment of the disclosure will be described in detail with reference to the accompanying drawings. Meanwhile, in the below, an example where a balancer device of an engine of the disclosure is applied to a motorcycle will be described. However, the disclosure is not limited thereto. For example, the balancer device of the engine of the disclosure may also be applied to a motorcycle of other type, a three-wheeled motor vehicle of a buggy type, a four-wheeled motor vehicle, or the like. Also, regarding directions, a vehicle front side is denoted with an arrow FR, a vehicle rear side is denoted with an arrow RE, a vehicle left side is denoted with an arrow L, and a vehicle right side is denoted with an arrow R, respectively. Also, in the respective drawings, some configurations are omitted for convenience of explanations.

Figure 1:
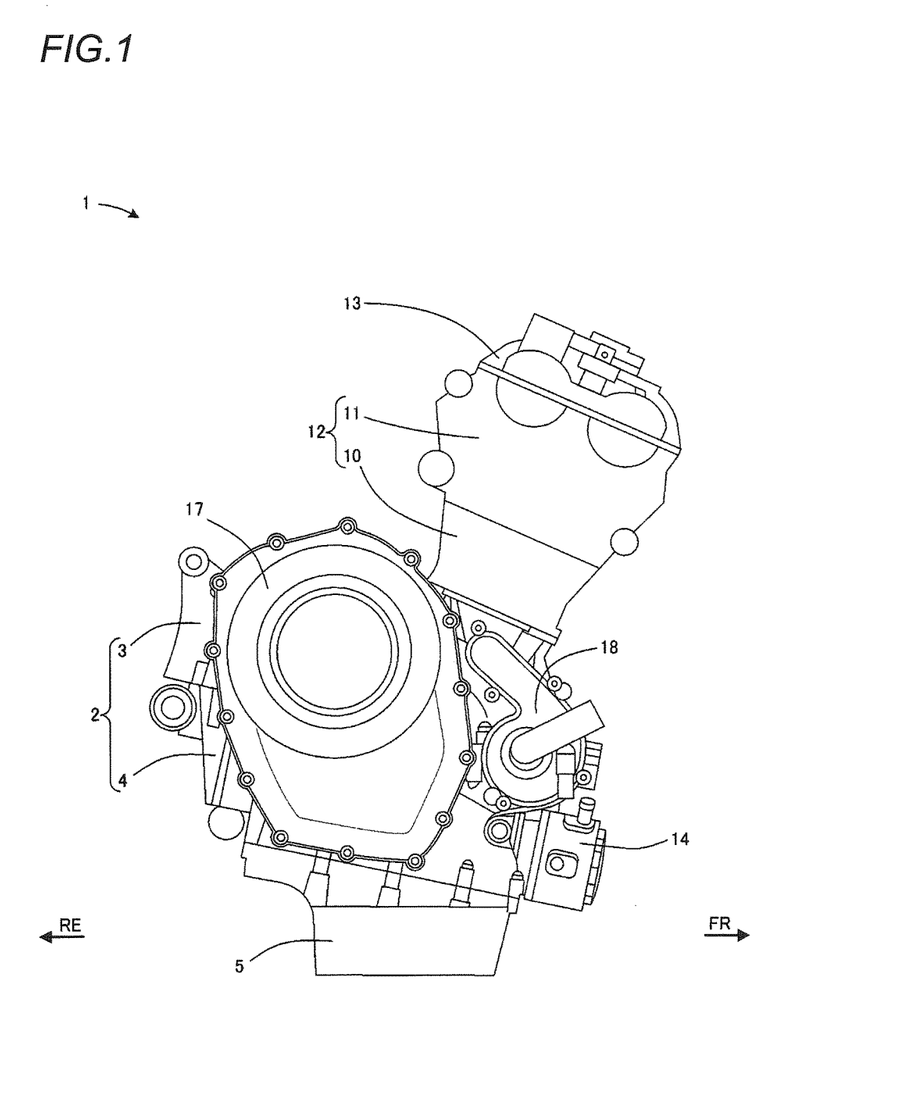
FIG. 1 is a side view depicting a schematic configuration of an engine of a motorcycle in accordance with an illustrative embodiment.
Figure 2:
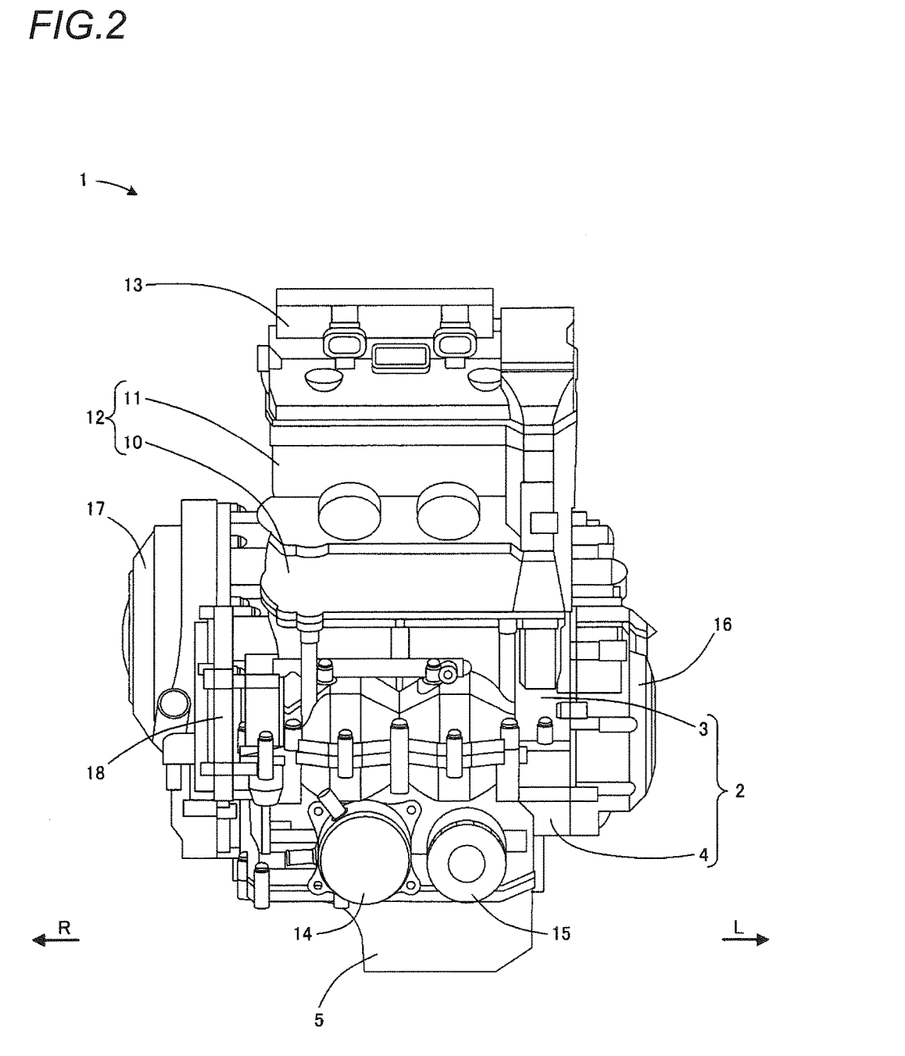
FIG. 2 is a front view of the engine shown in FIG. 1.

A schematic configuration of an engine of a motorcycle in accordance with an illustrative embodiment is described with reference to FIGS. 1 and 2. FIG. 1 is a side view depicting a schematic configuration of an engine of a motorcycle in accordance with an illustrative embodiment. FIG. 2 is a front view of the engine shown in FIG. 1.

As shown in FIGS. 1 and 2, an engine 1 is a two-cylinder four-cycle engine and has constitutional components such as pistons 22 (refer to FIG. 3) and the like accommodated in a cylinder assembly 12 configured by a cylinder block 10 and a cylinder head 11, and a cylinder head cover 13 is attached to an upper end of the cylinder assembly 12 (cylinder head 11). A crank case 2 configured to accommodate therein a crankshaft 20 (refer to FIG. 3) is attached to a rear-lower side of the cylinder assembly 12.

The crank case 2 is configured to be vertically separable and has an upper case 3 and a lower case 4. When the upper case 3 and the lower case 4 are combined, a space for accommodating a variety of shafts in the crank case 2 is formed. A front-upper part of the upper case 3 opens, and the cylinder block 10 is attached to the upper case 3 so as to block the opening. The lower case 4 opens downward, and an oil pan 5 is attached to the lower case 4 so as to block the opening.

Also, an oil cooler 14 configured to cool oil in the engine 1 and an oil filter 15 (which is not shown in FIG. 1) configured to filter unclean oil are attached to a front part of the lower case 4. As shown in FIG. 2, the oil cooler 14 is provided at a right side of the front part of the lower case 4 and the oil filter 15 is provided at a left side.

Both right and left sides of the crank case 2 are formed with openings, respectively. A magneto cover 16 (which is not shown in FIG. 1) configured to cover a magneto (not shown) is attached to the left opening, and a clutch cover 17 configured to cover a clutch (not shown) is attached to the right opening. A water pump 18 configured to supply cooling water into the engine 1 is provided in front of the clutch cover 17. Also, although not shown, a side stand 19 (refer to FIG. 10) configured to support a vehicle body (engine 1) is provided at a left-lower side of the crank case 2.

Figure 3:
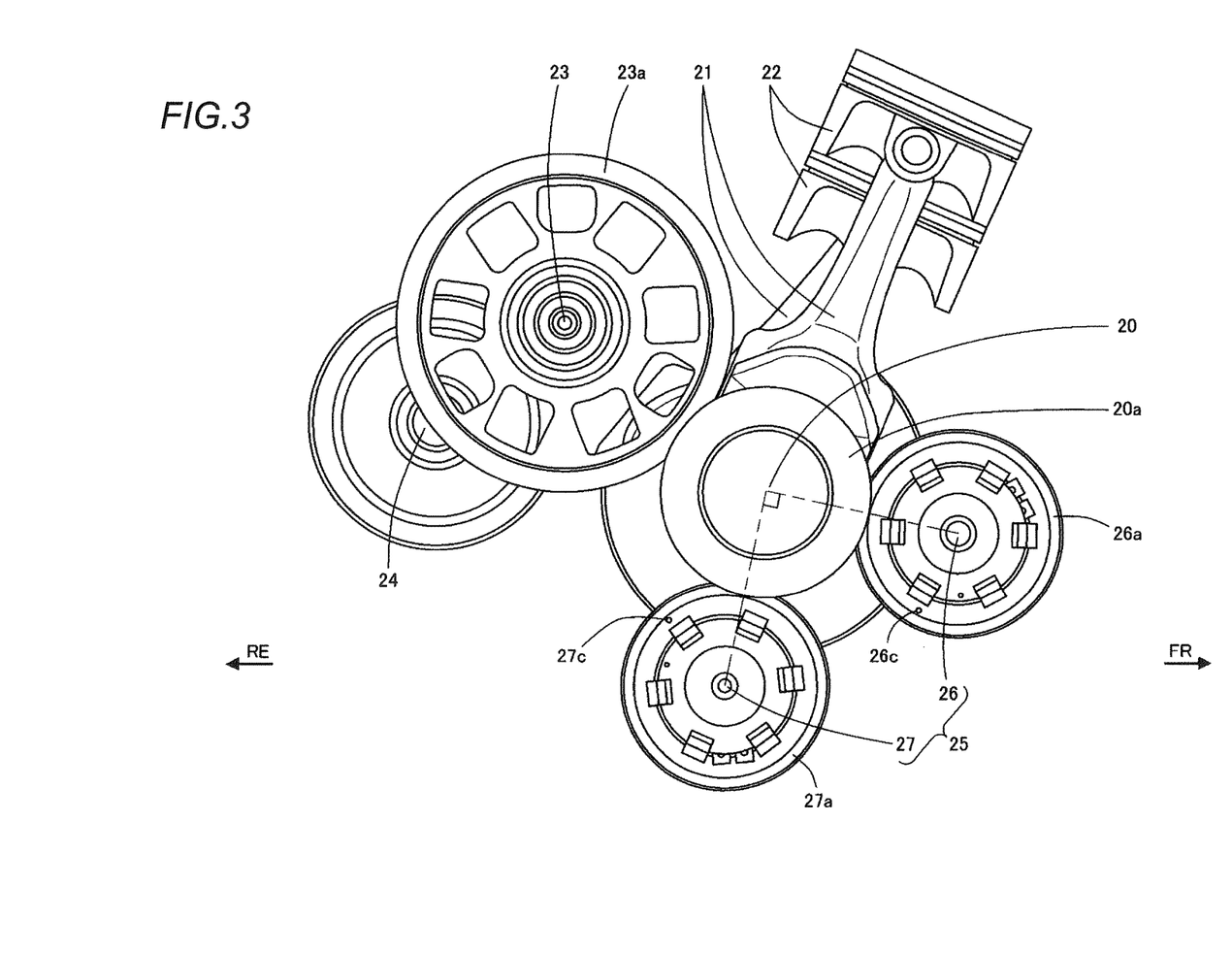
FIG. 3 is a side view depicting shaft arrangement in the engine in accordance with the illustrative embodiment.
Figure 4:
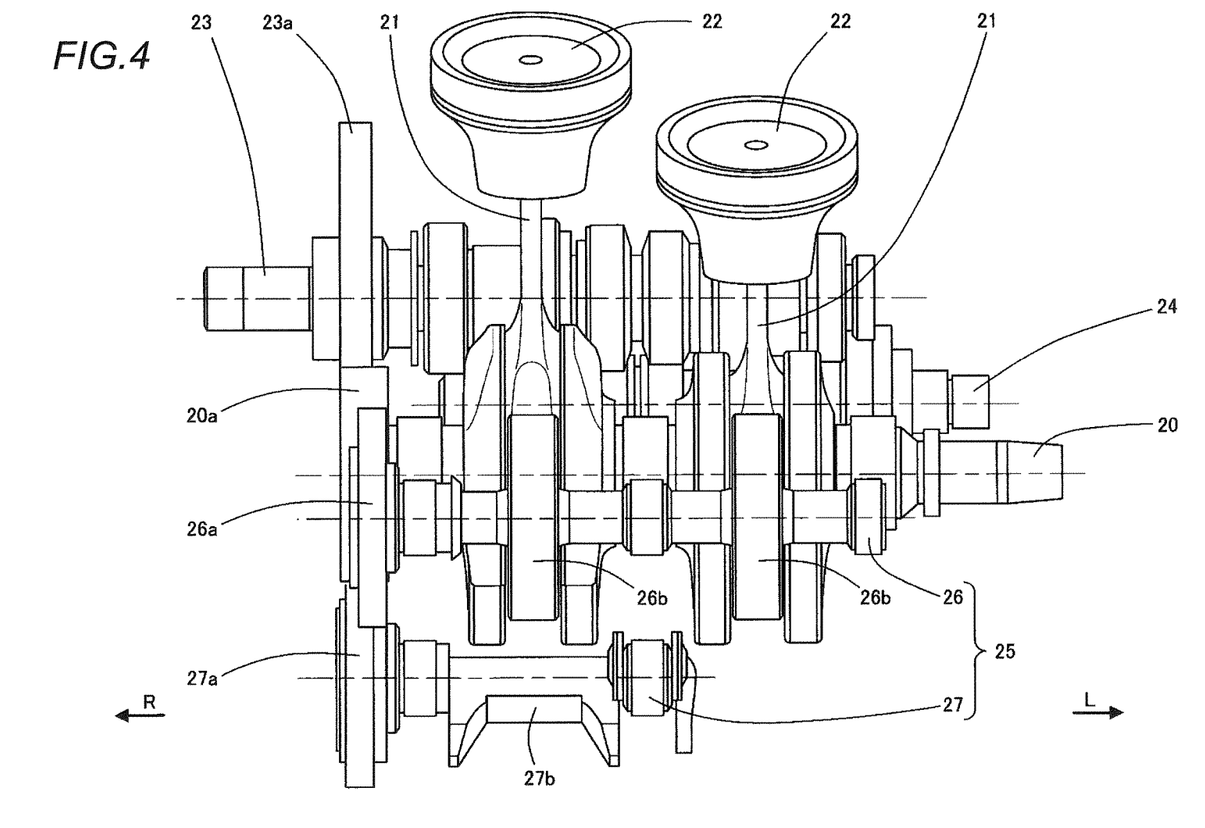
FIG. 4 is a front view depicting the shaft arrangement in the engine in accordance with the illustrative embodiment.

Subsequently, shaft arrangement in the crank case and a balancer device in accordance with the illustrative embodiment are described with reference to FIGS. 3 and 4. FIG. 3 is a side view depicting the shaft arrangement in the engine in accordance with the illustrative embodiment. FIG. 4 is a front view depicting the shaft arrangement in the engine in accordance with the illustrative embodiment. In FIGS. 3 and 4, the crank case is not shown and only the shaft arrangement is shown for convenience of explanations.

As shown in FIGS. 3 and 4, not only the crankshaft 20 but also a variety of shafts for transmitting a driving force of the engine 1 (refer to FIG. 1) are accommodated in the crank case 2 (refer to FIG. 1). In the below, arrangement positions of the diverse shafts are described on the basis of a position of the crankshaft 20. The crankshaft 20 is accommodated at the slight front of a center of the crank case 2 (refer to FIG. 6 or 7). Two pistons 22 are axially side by side attached to the crankshaft 20 via connecting rods 21. Meanwhile, a crank phase of the crankshaft 20 in accordance with the illustrative embodiment is set to 270°. Also, a right end portion of the crankshaft 20 is provided with a primary drive gear 20a for driving the diverse shafts in the engine 1 so that the primary drive gear can integrally rotate.

A countershaft 23 is provided at an oblique upper side of the rear of the crankshaft 20. A right end of the countershaft 23 is provided with a clutch (not shown), and a primary driven gear 23a is provided close to the clutch at an inner side of the clutch in a vehicle width direction. The primary driven gear 23a is attached to the countershaft 23 so that it can integrally rotate, and is meshed with the primary drive gear 20a. Also, the countershaft 23 is provided with a variety of gears for transmission at the left of the primary driven gear 23a.

A drive shaft 24 is provided at an oblique lower side of the rear of the countershaft 23. The drive shaft 24 is provided with a variety of gears for transmission. Also, a plurality of (two, in the illustrative embodiment) balancer shafts 25 configuring a part of the balancer device is provided around the crankshaft 20.

The balancer shafts 25 include a first balancer shaft 26 disposed at the front of the crankshaft 20 and a second balancer shaft 27 disposed below (just below) the crankshaft 20. The first balancer shaft 26 and the second balancer shaft 27 are disposed so that an angle between a line connecting the first balancer shaft 26 and the crankshaft 20 and a line connecting the second balancer shaft 27 and the crankshaft 20 is substantially a right angle.

The first balancer shaft 26 and the second balancer shaft 27 extend along an axial direction of the crankshaft 20. A first balancer driven gear 26a configured to mesh with the primary drive gear 20a is provided at a right end portion of the first balancer shaft 26 so as to be integrally rotatable. The first balancer shaft 26 is provided with two balancer weights 26b aligned side by side in the axial direction in correspondence to the positions of the two pistons 22.

A second balancer driven gear 27a configured to mesh with the primary drive gear 20a is provided at a right end portion of the second balancer shaft 27 so as to be integrally rotatable. The second balancer shaft 27 is provided with a balancer weight 27b at a position corresponding to the right piston 22. The second balancer shaft 27 is disposed at one side (right side) of the engine 1, i.e., the same side as the clutch.

Also, side surfaces of the first balancer driven gear 26a and the second balancer driven gear 27a are provided with reference marks 26c, 27c, which are references when phase adjusting the two balancer shafts 25 relative to the crankshaft 20. Likewise, a side surface of the primary drive gear 20a attached to the crankshaft 20 is also provided with a reference mark (not shown).

When mounting the two balancer shafts 25 to the crank case 2, the reference marks 26c, 27c of the first balancer driven gear 26a and the second balancer driven gear 27a are matched with the respective reference marks of the crankshaft 20, so that it is possible to adjust the two balancer shafts 25 to a predetermined phase with respect to the crankshaft 20.

In the engine 1 configured as described above, rotation of the crankshaft 20 is transmitted to the countershaft 23 via the primary drive gear 20a and the primary driven gear 23a. The rotation of the countershaft 23 is transmitted to the drive shaft 24 with a predetermined change gear ratio by combinations of the diverse gears. The rotation of the drive shaft 24 is transmitted to a rear wheel (not shown) via a transmission mechanism (not shown).

Also, the rotation of the crankshaft 20 is transmitted to the two balancer shafts 25 configuring the balancer device, too. Specifically, the rotation of the crankshaft 20 is transmitted to the first balancer shaft 26 via the primary drive gear 20a and the first balancer driven gear 26a, and the rotation of the crankshaft 20 is transmitted to the second balancer shaft 27 via the primary drive gear 20a and the second balancer driven gear 27a.

The vibrations of the engine 1 generated in association with the rotation of the crankshaft 20 are cancelled by the rotations of the first balancer shaft 26 and the second balancer shaft 27. The vibrations of the engine 1 are reduced in this way, so that it is possible to suppress an influence of the vibrations or noises on a passenger.

In an engine having a balancer device, the balancer shaft is not generally provided on the mating surface of the crank case. In this case, when attaching the balancer shaft, a peripheral component in which the balancer shaft is to be inserted, such as a weight, is disposed at a predetermined position in the crank case in advance. Then, the balancer shaft can be attached by inserting the same into a shaft hole of the crank case and a shaft hole of the weight from an outside of the crank case. In this way, since it is necessary to insert the balancer shaft while positioning the peripheral component such as the weight, it cannot be said that the mounting ability is good.

Therefore, in the illustrative embodiment, the crankshaft 20 and the two balancer shafts 25 (particularly, the second balancer shaft 27) are disposed on the mating surface of the crank case 2. Thereby, it is possible to attach the respective shafts by interposing the same between the upper case 3 and the lower case 4 or between the lower case 4 and the balancer housing 6 (which will be described later). Therefore, it is possible to improve the mounting ability of the engine 1.

In addition, in an engine having a balancer device, it is necessarily required to phase-adjust the balancer shaft with respect to the crankshaft. In an engine of the related art, a dedicated opening for phase adjustment is formed at a predetermined position of the crank case corresponding to the balancer shaft. An operator inserts a finger into the crank case from the opening and rotates a gear provided for the balancer shaft for phase adjustment.

After the phase adjustment, the opening is blocked by a blind plug for sealing an inside of the crank case. Like this, the configuration where the opening is formed only for phase adjustment and the blind plug is provided is troublesome with respect to the manufacturing of the engine. Also, the configuration where the bling plug is provided for sealing is not preferable because it influences an outward appearance of the engine. Further, since it is necessary to form the opening as small as possible, the operability is not good.

Therefore, in the illustrative embodiment, an opening 29 (refer to FIG. 8) is formed at a side of the crank case 2, and parts of the crankshaft 20 and the balancer shaft 25 (particularly, the second balancer shaft 27) are disposed at an inner side of the opening 29. Thereby, it is possible to visibly recognize parts of the crankshaft 20 and the balancer shaft 25, so that it is possible to easily perform the phase-adjustment. Also, since the opening 29 can be blocked by the clutch cover 17 (refer to FIG. 1), it is not necessary to provide a blind plug for blocking the opening 29. In this way, it is possible to improve the mounting ability of the balancer shaft with the simple configuration without providing a dedicated opening for phase adjustment.

Also, in the illustrative embodiment, the shaft arrangement in the engine 1 is changed to drive the three shafts of the countershaft 23 and the two balancer shafts 25 (the first balancer shaft 26 and the second balancer shaft 27) with one primary drive gear 20a. Thereby, it is possible to drive the two balancer shafts 25 only with the existing primary drive gear 20a and it is not necessary to separately provide the gear for driving the balancer shaft. As a result, it is possible to reduce the width of the engine 1 in the right-left direction without extending the crankshaft 20. Further, since it is possible to configure a gear, which is to be provided for the crankshaft 20, only by the one primary drive gear 20a, it is possible to save the processing cost of the crankshaft 20, thereby achieving the cost down.

Also, the first balancer shaft 26 is provided at the front of the crankshaft 20 and the second balancer shaft 27 is provided below the crankshaft 20, so that it is possible to dispose the two balancer shafts 25 in the engine 1 without increasing the widths of the engine 1 in the upper-lower direction and the front-rear direction. By these configurations, it is possible to make the engine compact as a whole.

Also, as described above, the three shafts are driven by the one primary drive gear 20a and the respective gears (the primary driven gear 23a, the first balancer driven gear 26a and the second balancer driven gear 27a) are intensively disposed at the right side. Thereby, it is possible to check the reference marks 26c, 27c of the first balancer driven gear 26a and the second balancer driven gear 27a at the same time, so that it is possible to improve the mounting ability of the two balancer shafts 25.

Also, in the illustrative embodiment, since the first balancer shaft 26 and the water pump 18 (refer to FIG. 1) are coaxially provided, it is possible to drive the water pump 18 by using the rotation of the first balancer shaft 26 as a driving source. Therefore, it is not necessary to provide a dedicated gear for the water pump 18 and it is possible to simplify the configuration.

Figure 5:
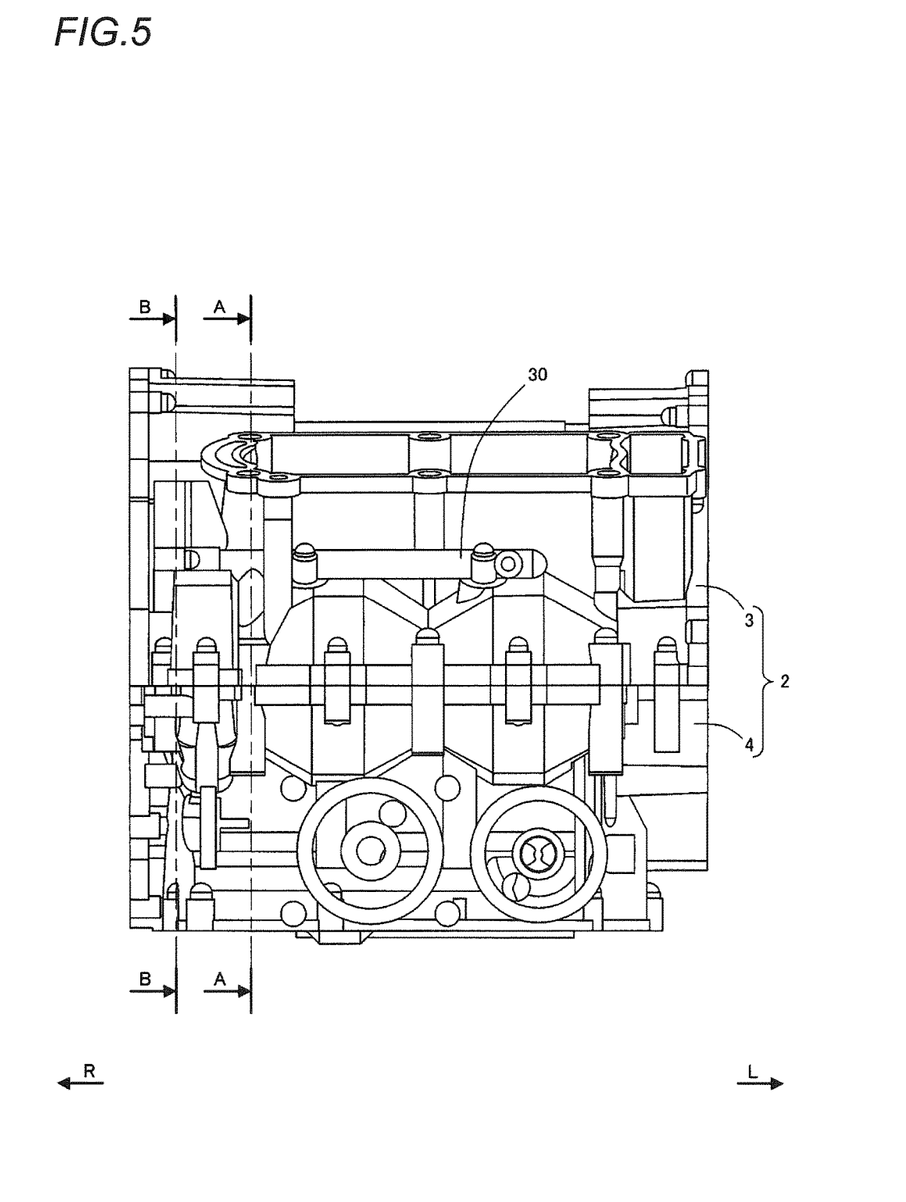
FIG. 5 is a front view of a crank case in accordance with the illustrative embodiment.
Figure 6:
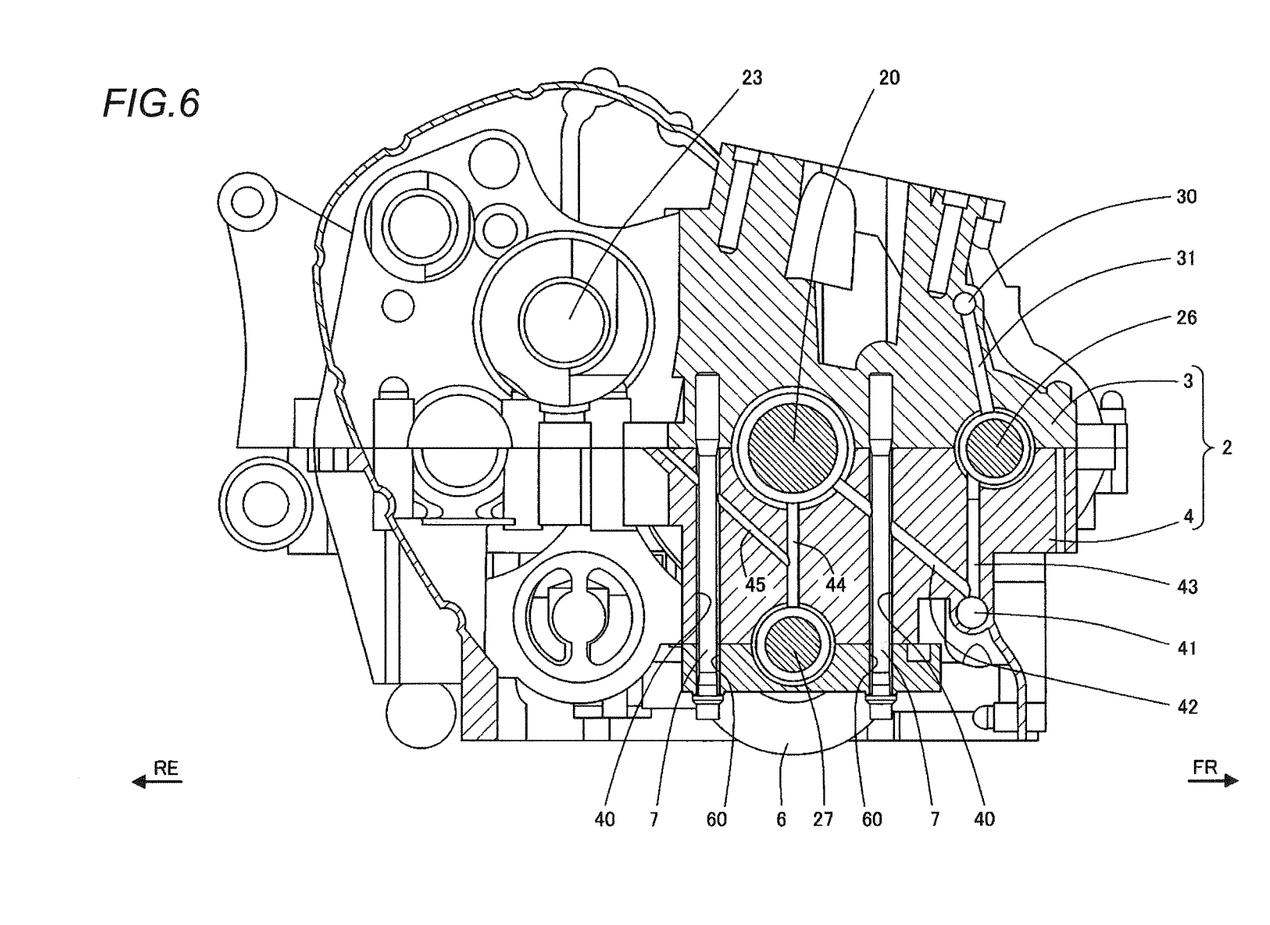
FIG. 6 is a sectional view taken along a line A-A of the crank case shown in FIG. 5.
Figure 7:
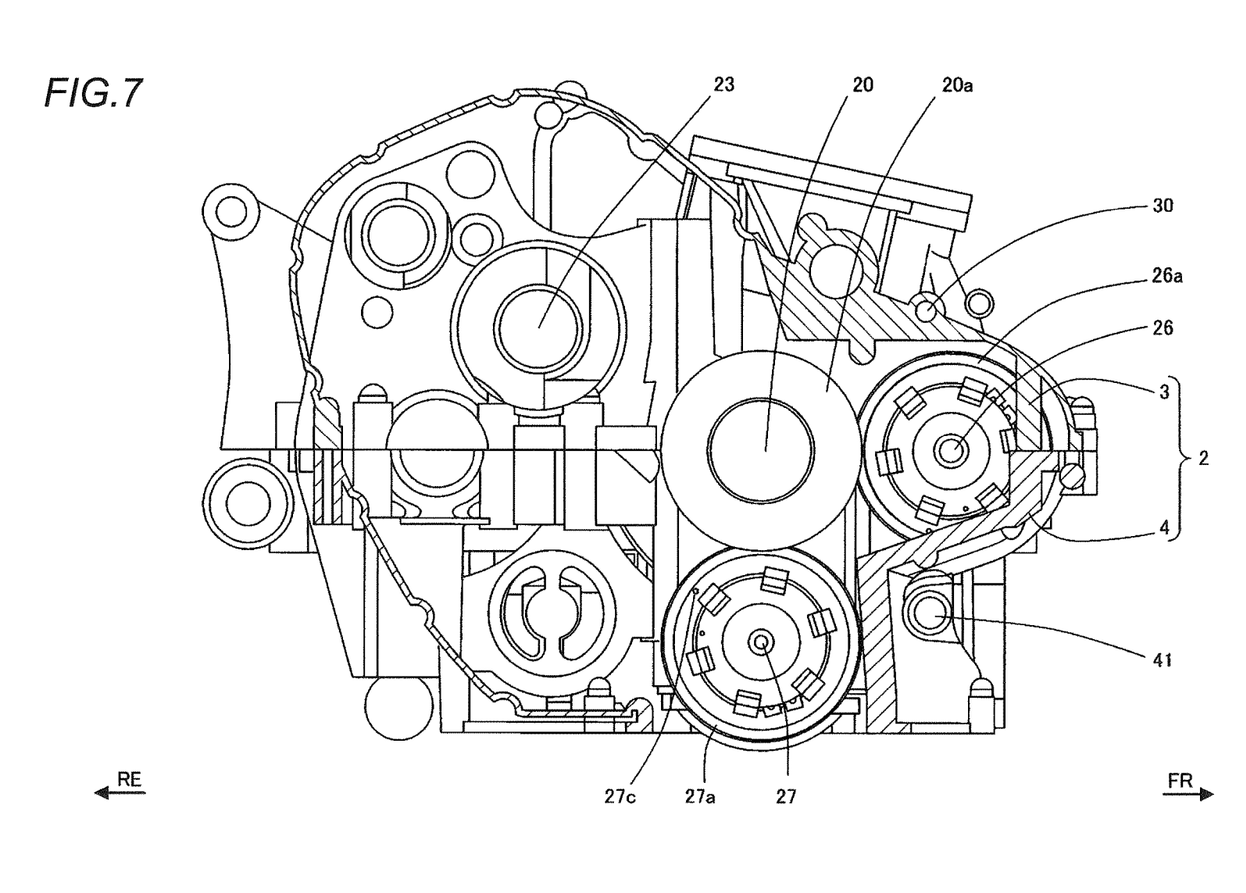
FIG. 7 is a sectional view taken along a line B-B of the crank case shown in FIG. 5.
Figure 8:
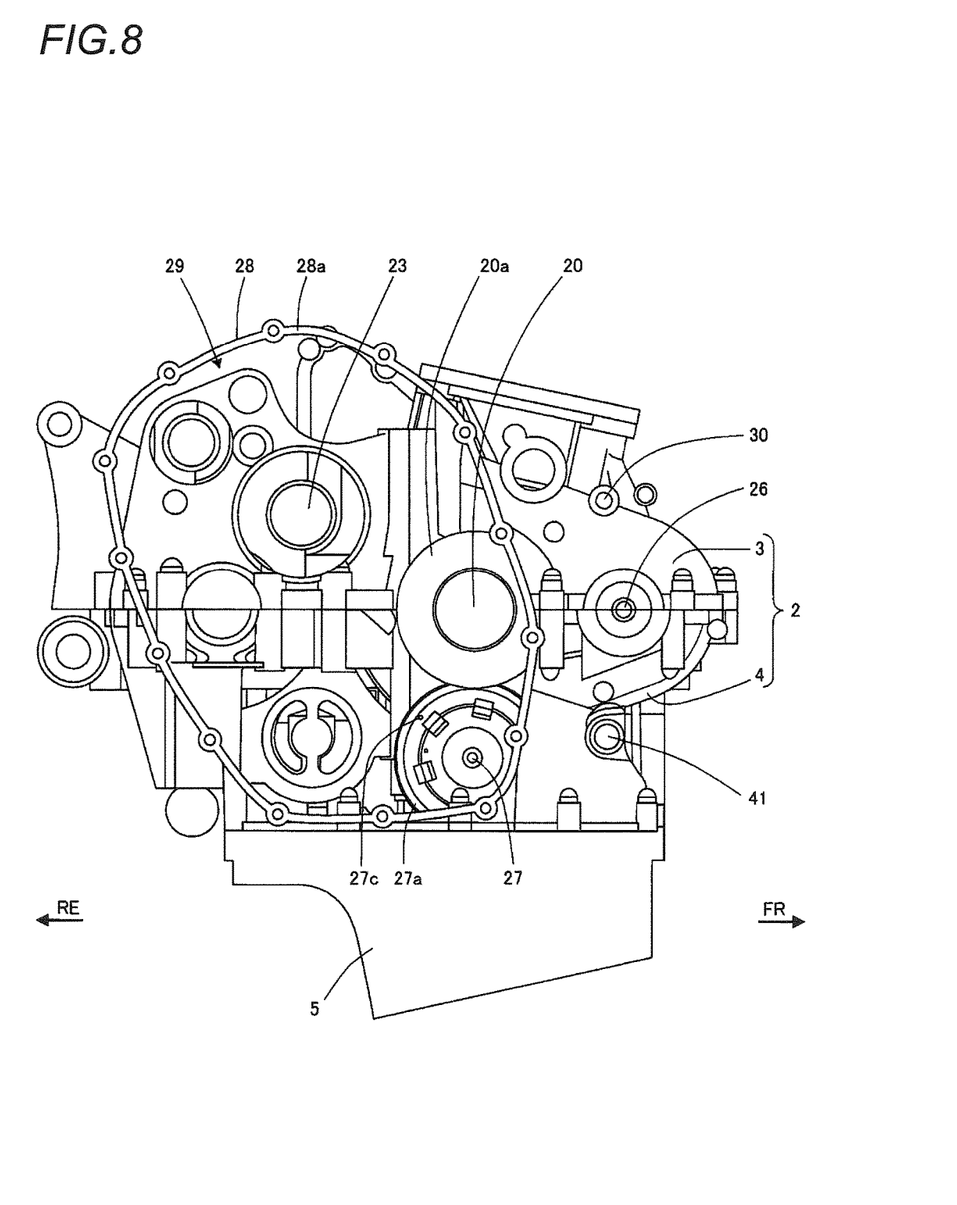
FIG. 8 is a side view depicting a state where a clutch cover is detached from the engine in accordance with the illustrative embodiment.

Subsequently, a positional relation between the diverse shafts in the engine and the crank case and the internal configuration of the crank case are described with reference to FIGS. 5 to 8. FIG. 5 is a front view of the crank case in accordance with the illustrative embodiment. FIG. 6 is a sectional view taken along a line A-A of the crank case shown in FIG. 5. FIG. 7 is a sectional view taken along a line B-B of the crank case shown in FIG. 5. In FIG. 7, the oil pan is not shown for convenience of explanations. FIG. 8 is a side view depicting a state where the clutch cover and the oil pan are detached from the engine in accordance with the illustrative embodiment.

As shown in FIGS. 5 and 6, in the illustrative embodiment, the crankshaft 20 and the first balancer shaft 26 are disposed on mating surfaces of the upper case 3 and the lower case 4. More specifically, the mating surfaces of the upper case 3 and the lower case 4 are formed with two bearings in the front-rear direction. The first balancer shaft 26 is disposed in the front bearing, and the crankshaft 20 is disposed in the rear bearing. Also, the second balancer shaft 27 is supported by the lower case 4 and the balancer housing 6 configured to accommodate therein the second balancer shaft 27. Mating surfaces of the lower case 4 and the balancer housing 6 are formed with a bearing in which the second balancer shaft 27 is disposed.

The lower case 4 and the balancer housing 6 are respectively formed with a plurality of through-holes 40, 60 (only two through-holes are shown, respectively, in FIG. 6) in which fastening bolts 7 are to be inserted. The plurality of through-holes 40, 60 is formed at positions between which the crankshaft 20 or the second balancer shaft 27 is sandwiched in the front-rear direction. Also, the upper case 3 is formed with screw holes (not shown) at positions corresponding to the plurality of through-holes 40, 60. The fastening bolts 7 are inserted into the through-holes 40, 60 from the lower of the balancer housing 6 and are then screwed into the upper case 3, so that the upper case 3, the lower case 4 and the balancer housing 6 are integrally fixed.

In this way, the crankshaft 20, the first balancer shaft 26 and the second balancer shaft 27 are arranged on the mating surfaces of the crank case 2 and the balancer housing 6, so that it is possible to attach the corresponding shafts just by sandwiching the same with the upper case 3, the lower case 4 and the balancer housing 6.

Particularly, the first balancer shaft 26 can be mounted to the crank case 2 with the first balancer driven gear 26a and the balancer weight 26b being assembled in advance. The second balancer shaft 27 can also be mounted to the crank case 2 with the second balancer driven gear 27a and the balancer weight 27b being assembled in advance. As a result, the mounting ability of the engine 1 is improved.

Also, since the balancer housing 6 is formed to cover the lower side of the second balancer shaft 27, it is possible to support the second balancer shaft 27 simply by covering the crank case 2 (lower case 4) with the balancer housing 6. Thereby, the mounting ability of the engine 1 is improved. Also, for a vehicle where the second balancer shaft 27 is not used, for example, it is possible to easily change a design by milling the balancer housing 6 to shorten a length of the fastening bolt 7. For this reason, it is possible to save the design man-hour, too.

Further, since the upper case 3, the lower case 4 and the balancer housing 6 are together fastened by the fastening bolts 7, it is possible to reduce the number of the fastening bolts 7 to be used, as compared to a configuration where the bolt fastening is performed for each of the crankshaft 20 and the second balancer shaft 27. Thereby, it is possible to reduce the mounting man-hour and an operator's burden on the bolt fastening. Also, even when combining the respective bearings (bearings of the crankshaft and the two balancer shafts 25), it is possible to reduce the number of times of the bolt fastening, so that it is possible to save the processing man-hour and to improve the operation efficiency.

Herein, an oil passage in the crank case 2 is described. As shown in FIG. 6, the lower case 4 is provided with a main oil gallery 41, which configures a part of the oil passage in the engine 1, below the first balancer shaft 26 and in front of the second balancer shaft 27. The main oil gallery 41 extends in the right-left direction.

Also, the lower case 4 is formed with oil passages 42, 43 for supplying the oil from the main oil gallery 41 to the crankshaft 20 and the first balancer shaft 26 and an oil passage 44 for supplying the oil from the crankshaft 20 to the second balancer shaft 27. Further, the oil passage 44 is formed with an oil passage 45 for supplying the oil to the drive shaft 24 (refer to FIG. 3). The oil passages 42, 45 are formed to obliquely penetrate the plurality of through-holes

40. Thereby, it is possible to utilize the through-hole 40 for the fastening bolt 7 as a part of the oil passage.

Meanwhile, the upper case 3 is provided with a sub-oil gallery 30 above the first balancer shaft 26. The sub-oil gallery 30 extends in the right-left direction. Also, the upper case 3 is formed with an oil passage 31 for supplying the oil from the main oil gallery 41 to the sub-oil gallery 30 through the first balancer shaft 26.

In the illustrative embodiment, the above-described shaft arrangement is adopted and the main oil gallery 41 and the sub-oil gallery 30 are provided in an empty space near the two balancer shafts 25. Thereby, it is possible to form the oil passage to each shaft (bearing) as a linear through-hole. For this reason, it is possible to form the oil passage by simple hole processing, so that it is possible to save the processing man-hour.

Also, since the crankshaft 20 and the second balancer shaft 27 are disposed adjacent to each other in the lower case 4, it is possible to easily form the oil passage between the crankshaft 20 and the second balancer shaft 27 by the hole processing. Therefore, it is possible to save a weight of the crank case 2, as compared to a configuration where an independent oil passage is separately formed using an unnecessary thickness of the crank case 2.

Also, as shown in FIGS. 7 and 8, in the engine 1, the oil is reserved in the oil pan 5. The oil is pumped by an oil pump (not shown) and is then supplied to each part in the engine 1 through the main oil gallery 41, the sub-oil gallery 30 and the like. In the illustrative embodiment, a liquid surface of the oil is positioned at a height at which the second balancer driven gear 27a and the balancer weight 27b of the second balancer shaft 27 are not submerged. For this reason, it is possible to prevent the oil from becoming a rotation resistance (mechanism loss) of the second balancer shaft 27. Also, it is possible to prevent the rotary bodies (the second balancer driven gear 27a and the balancer weight 27b) from stirring the oil to introduce air bubbles into the oil.

Also, as described above, the liquid surface height of the oil is set to the height at which the rotary bodies are not submerged. Thereby, even though the oil surface move in waves when the vehicle body is banked during the cornering, for example, it is possible to prevent the oil from directly colliding with the rotary bodies.

Further, the second balancer shaft 27 is provided just below the crankshaft 20, so that it is possible to interrupt a descending air current, which is to be generated when the pistons 22 (refer to FIG. 3) moves downward, by the balancer housing 6 (refer to FIG. 6). That is, it is possible to achieve a windshield effect by the balancer housing 6 becoming a wall. For this reason, the liquid surface of the oil reserved in the oil pan 5 does not undulate by the descending air current. Therefore, it is possible to prevent a situation where the air bubbles are introduced into the oil and the lubrication performance is thus lowered.

Also, as shown in FIG. 8, the right side of the crank case 2 is formed with an opening 29 for accommodating the clutch (not shown) by an annular peripheral wall part 28. The peripheral wall part 28 has a shape conforming to a profile of the clutch cover 17 (refer to FIG. 1 or 2). Also, an end surface (side surface) of the peripheral wall part 28 configures a mating surface 28a with the clutch cover 17. The clutch cover 17 is attached along the mating surface 28a, so that the opening 29 is blocked.

At a state where the clutch cover 17 is detached, parts of the crankshaft 20 and the second balancer shaft 27 are positioned in the opening 29, as seen from a side of the engine 1. More specifically, parts of the primary drive gear 20a and the second balancer driven gear 27a and the bearings of the crankshaft 20 and the second balancer shaft 27 are disposed in a space surrounded by the annular peripheral wall part 28.

In this way, parts of the crankshaft 20 and the second balancer shaft 27 are exposed to an outside, so that it is possible to easily recognize the reference mark 27c for phase adjustment. That is, it is possible to utilize the opening 29 of the crank case 2, which occupies most of the side surface of the engine 1, as a viewing window for phase adjustment of the second balancer shaft 27. Thereby, it is possible to phase-adjust the second balancer shaft 27 relative to the crankshaft 20 without providing a dedicated viewing window.

Also, it is not necessary to perform hole processing for forming a dedicated viewing window and to provide a blind plug for blocking the hole, so that it is possible to simplify the configuration of the crank case 2. Further, the blind plug is not required, so that an outward appearance of the engine 1 is not influenced.

Also, the bearings of the crankshaft 20 and the second balancer shaft 27 are exposed from the opening 29 of the crank case 2, so that it is possible to secure a wide space when processing the bearings. That is, since it is possible to secure a wide area for supporting a processing tool, it is possible to stably support the processing tool to the mating surface 28a. Therefore, it is possible to suppress shaking upon the processing of the bearings (holes), so that it is possible to improve processing precision.

Also, since only parts (bearings) of the crankshaft 20 and the second balancer shaft 27 are exposed, instead of entirely exposing the same, it is possible to form the opening 29 of the crank case 2 to a minimal size. Therefore, it is possible to increase the rigidity of the crank case 2, as compared to a configuration where the respective shafts are entirely exposed.

Figure 9:
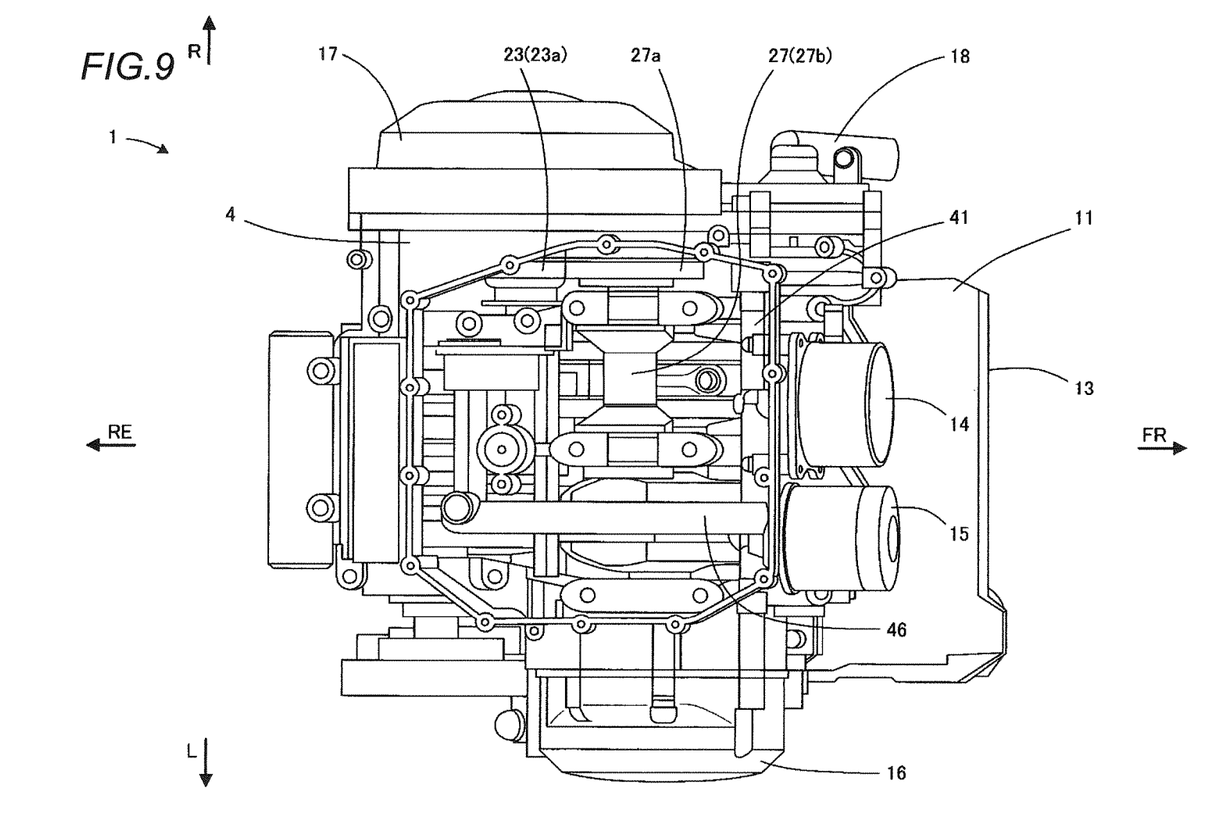
FIG. 9 is a bottom view depicting a state where an oil pan is detached from the engine in accordance with the illustrative embodiment.

Subsequently, a positional relation between the shaft arrangement and the oil passage in the crank case is described with reference to FIG. 9. FIG. 9 is a bottom view depicting a state where the oil pan is detached from the engine in accordance with the illustrative embodiment.

As shown in FIG. 9, the second balancer shaft 27 is disposed at the right side of the engine 1 (lower case 4). Also, a space of an opposite side (left side) of the second balancer shaft 27 is provided with a cylindrical oil passage 46 extending in the front-rear direction. The oil passage 46 configures a path for supplying the oil from the oil pump (not shown) to the oil filter 15. In this way, the primary drive gear 20a (not shown in FIG. 9) and the second balancer shaft 27 are disposed at one side (right side) of the engine 1 in the right-left direction and the left empty space of the engine 1 is provided with the oil passage 46, so that it is possible to efficiently utilize the space in the engine 1. As a result, it is possible to form an optimal oil passage without enlarging the engine 1, so that it is possible to make the engine 1 compact.

Figure 10:
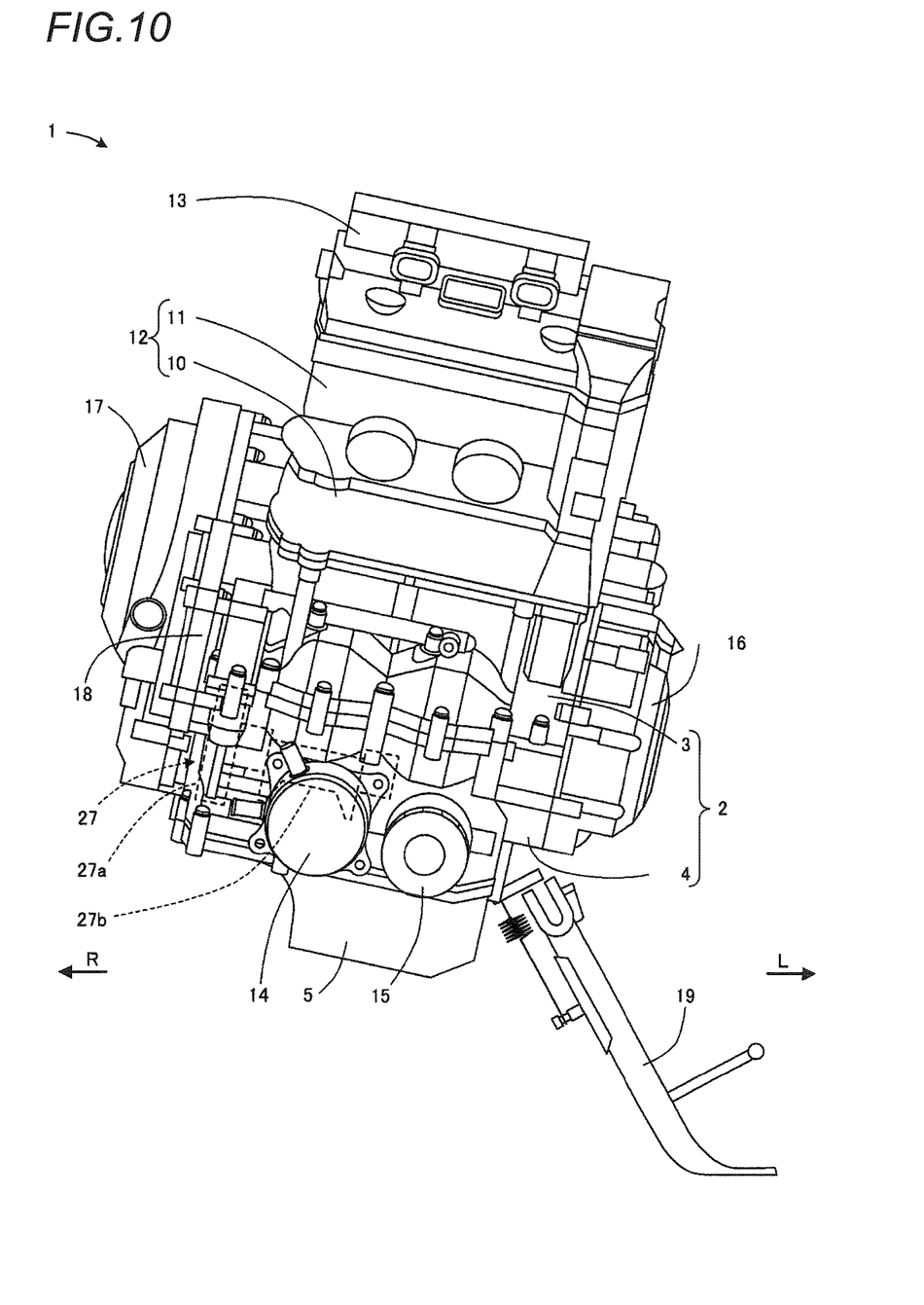
FIG. 10 is a front view of the engine when a side stand is used for a motorcycle in accordance with an illustrative embodiment.

Subsequently, the oil surface in the engine when a side stand is used is described with reference to FIG. 10. FIG. 10 is a front view of the engine when a side stand is used for a motorcycle in accordance with an illustrative embodiment.

As shown in FIG. 10, a side stand 19 configured to support the vehicle body (engine 1) is provided at the left of the engine 1 and below the crank case 2 (lower case 4) (at the left of the oil pan 5). At a state where the vehicle body is supported by the side stand 19, the vehicle is inclined toward the side stand-side (left side), so that the engine 1 is inclined.

As described above with reference to FIG. 3, the second balancer shaft 27 is disposed at the right side of the engine 1. That is, the second balancer shaft 27 is disposed at an opposite side to the side stand 19. Therefore, even when the side stand 19 is used and the engine 1 is thus inclined toward the side stand 19-side, the second balancer shaft 27 is located at a higher position than the liquid surface of the oil at the side stand 19-side. For this reason, it is possible to prevent the second balancer shaft 27 from being submerged in the oil, so that it is possible to reduce the mechanism loss upon the start of the engine.

Also, it is possible to prevent the rotary bodies such as the second balancer driven gear 27a and the balancer weight 27b provided for the second balancer shaft 27 from stirring the oil to introduce the air bubbles into the oil.

As described above, according to the illustrative embodiment, the crankshaft 20 is disposed on the mating surface of the upper case 3 and the lower case 4, so that it is possible to attach the crankshaft 20 simply by interposing the same between the upper case 3 and the lower case 4. Also, the second balancer shaft 27 is disposed on the mating surface of the lower case 4 and the balancer housing 6, so that it is possible to attach the second balancer shaft 27 simply by interposing the same between the lower case 4 and the balancer housing 6. Therefore, it is possible to attach the crankshaft and the second balancer shaft with the peripheral components being assembled to the crankshaft 20 or the second balancer shaft 27. As a result, the mounting ability of the engine 1 is improved.

According to the illustrative embodiment, it is possible to visibly recognize the part of the second balancer shaft 27 from the opening 29 of the crank case 2. Therefore, it is possible to easily phase-adjust the second balancer shaft 27 from the outside of the crank case 2 without providing a dedicated opening for phase adjustment. Also, the clutch cover 17 is attached, so that the opening 29 is blocked. Thereby, it is not necessary to provide a blind plug for blocking the opening 29. In this way, it is possible to improve the mounting ability of the second balancer shaft 27 with the simple configuration.

In the meantime, the disclosure is not limited to the illustrative embodiment and can be diversely changed and implemented. In the illustrative embodiment, the sizes, shapes and the like shown in the accompanying drawings are not limited thereto and can be appropriately changed within a scope of achieving the effects of the disclosure. In addition, the illustrative embodiment can be appropriately changed without departing from the object of the disclosure.

For example, in the above illustrative embodiment, the balancer device having the two balancer shafts 25 has been described. However, the disclosure is not limited thereto. For example, the balancer device may have one balancer shaft or three or more balancer shafts.

Also, in the above illustrative embodiment, the first balancer shaft 26 is provided with the two balancer weights 26b. However, the disclosure is not limited thereto. For example, only one balancer weight 26b may be provided for the first balancer shaft 26. In this case, the balancer weight 26b is preferably provided in front of the left piston 22.

Also, in the above illustrative embodiment, the first balancer shaft 26 and the balancer weight 26b are configured as separate components. However, the disclosure is not limited thereto. For example, the first balancer shaft 26 and the balancer weight 26b may be integrally configured. The second balancer shaft 27 and the balancer weight 27b may also be integrally configured without being limited to the configuration where they are configured as separate components.

As described above, the disclosure has the effect of disposing the balancer shafts without enlarging the engine, and is particularly useful for the balancer device of the engine and the motorcycle.

What is claimed is:

1. A balancer device of an engine, configured to reduce rotation vibrations of the engine, the balancer device comprising:
    a crankshaft disposed on a mating surface of a crank case divided into an upper case and a lower case;
    a balancer shaft disposed below the crankshaft; and
    a balancer housing accommodating therein the balancer shaft,
    wherein the balancer shaft is disposed on a mating surface between the lower case and the balancer housing, and
    wherein the balancer shaft is disposed at an opposite side to a side stand configured to support a vehicle body with respect to the right-left direction.

2. The balancer device according to claim 1, wherein the upper case, the lower case and the balancer housing are fastened together by a fastening bolt.

3. The balancer device according to claim 1, wherein the balancer housing is formed to cover the balancer shaft.

4. The balancer device according to claim 1, wherein the balancer shaft is disposed at one side of the engine in a right-left direction of the engine and an oil passage extending in a front-rear direction of the engine is provided at the other side of the engine.

5. A motorcycle comprising the balancer device according to claim 1.

6. A balancer device of an engine, configured to reduce rotation vibrations of the engine, the balancer device comprising:
    a crank case having an opening at a side thereof;
    a crankshaft disposed in the crank case;
    a balancer shaft disposed below the crankshaft;
    a clutch cover attached to cover the opening of the crank case; and
    a balancer housing accommodating therein the balancer shaft,
    wherein
        at least a part of the balancer shaft is positioned within the opening such that the part of the balancer is visible through the opening as seen in an orthographic side view from the outside of the engine in a state where the clutch cover is detached from the crank case,
        a bearing configured to support the balancer shaft is positioned at an inner side of the opening of the crank case, as seen from a side of the engine, and
        the bearing is formed by the crank case and the balancer housing.

7. The balancer device according to claim 6, wherein the balancer shaft is disposed at the same side as a clutch with respect to a right-left direction of the engine.

8. The balancer device according to claim 6, wherein an end portion of the crankshaft is provided with a primary drive gear configured to drive the balancer shaft.

9. A motorcycle comprising the balancer device according to claim 6.

* * * * *